United States Patent
Wixey (10) Patent No.: US 11,642,810 B2
(45) Date of Patent: May 9, 2023

(54) ADJUSTABLE FENCE MOUNTING ASSEMBLY FOR A TABLE SAW

(71) Applicant: Barry Douglas Wixey, Seattle, WA (US)

(72) Inventor: Barry Douglas Wixey, Seattle, WA (US)

(*) Notice: Subject to any disclaimer, the term of this patent is extended or adjusted under 35 U.S.C. 154(b) by 146 days.

(21) Appl. No.: 16/863,204

(22) Filed: Apr. 30, 2020

(65) Prior Publication Data
US 2020/0361114 A1     Nov. 19, 2020

Related U.S. Application Data

(60) Provisional application No. 62/920,499, filed on May 1, 2019.

(51) Int. Cl.
  *B27B 27/10*  (2006.01)
  *B23D 59/00*  (2006.01)
  *B27B 27/02*  (2006.01)
(52) U.S. Cl.
  CPC ............ *B27B 27/10* (2013.01); *B23D 59/001* (2013.01); *B27B 27/02* (2013.01)
(58) Field of Classification Search
  CPC ......... B27B 27/10; B27B 27/02; B27B 27/08; B23D 59/001; Y10T 83/739; Y10T 83/727; Y10T 83/7613; Y10T 83/7607
  See application file for complete search history.

(56) References Cited

U.S. PATENT DOCUMENTS

| | | | | |
|---|---|---|---|---|
| 1,938,548 A | * | 12/1933 | Tauts | B23Q 1/74 83/438 |
| 4,521,006 A | * | 6/1985 | Waters | B23Q 1/267 269/304 |
| 4,696,213 A | * | 9/1987 | Conneally | B27B 27/10 269/318 |
| 5,251,142 A | * | 10/1993 | Cramer | B23D 59/008 700/171 |
| 5,722,308 A | * | 3/1998 | Ceroll | B27B 27/02 144/287 |
| 7,683,635 B1 | * | 3/2010 | Wixey | G01D 5/2415 324/662 |
| 2005/0223862 A1 | * | 10/2005 | Oberheim | B27B 27/02 83/477.2 |
| 2006/0065087 A1 | * | 3/2006 | Griswold | B23Q 3/007 83/13 |
| 2010/0071521 A1 | * | 3/2010 | Hadaway | B27B 27/02 83/76.1 |

(Continued)

*Primary Examiner* — Evan H Macfarlane
*Assistant Examiner* — Fernando A Ayala
(74) *Attorney, Agent, or Firm* — William E. Noonan (57) ABSTRACT

An adjustable mounting assembly for a table saw fence includes an elongate track for connecting to a table saw. A carriage is supported by and movable longitudinally on the track for carrying the fence such that the fence extends across a tabletop of the table saw. An incremental adjustment wheel mechanism is rotatably supported by the carriage and interengages the track. The adjustment wheel mechanism is rotated a selected amount to adjust the position of the carriage on the track. The track carries an electronic sensor strip and a digital readout attached to the carriage movably cooperates with the electronic sensor strip for measuring and displaying the longitudinal position of the carriage on the track and the position of the fence relative to the saw blade.

21 Claims, 11 Drawing Sheets

(56) References Cited

U.S. PATENT DOCUMENTS

2011/0197733 A1\* 8/2011 Liu ................. B23Q 3/005
  83/444
2014/0158437 A1\* 6/2014 Mukhopadhyay ........ B22F 7/06
  175/432

\* cited by examiner

ADJUSTABLE FENCE MOUNTING ASSEMBLY FOR A TABLE SAW

RELATED APPLICATION

This application claims the benefit of U.S. Provisional Application Ser. No. 62/920,499 filed May 1, 2019.

FIELD OF THE INVENTION

This invention relates to an adjustable assembly for mounting a fence to a table saw of the type used in woodworking applications. More particularly, the assembly allows the position, height and angular orientation of the fence to be precisely and conveniently adjusted so that accurate and improved cutting results are achieved.

BACKGROUND OF THE INVENTION

Table saws are used in a wide variety of woodworking applications such as cutting boards, planks, studs, panels and other types of lumber. Most table saws employ a fence, which helps the operator properly position a wood workpiece on the tabletop relative to the saw blade. Such fences are conventionally adjustable so that they can be spaced a desired distance from the blade.

It can often be quite time consuming and frustrating to effectively adjust many of the table saw fences currently available. Typically, the fence is slidably mounted by a metal carriage on an underlying track attached to the table. To reposition the carriage and the attached fence along the tabletop, the operator usually must push it by hand along the track. In many cases the sliding track does not cooperate. It is apt to stick and may have to be struck forcefully by the operator. In any event, the carriage usually features far less than an optimally smooth movement. As a result, performing such adjustments by hand often requires repetitive, tedious and time consuming readjustment of the fence back and forth along the track. It can therefore be difficult to achieve the precise desired positioning of the fence normally required in woodworking applications.

Some known table saws have featured micro or incremental adjustment of the table saw fence. However, to date, such systems tend to be awkward and unduly time consuming to use. Some require that two separate locking operations be performed respectively before and after the micro-adjustment is made. This unnecessarily complicates and prolongs the woodworking operation.

In addition to the problems currently encountered in adjusting the fence and distancing it properly from the saw blade, it is also sometimes necessary to make other types of adjustments to the positioning of the fence, such as varying the height and/or the angular orientation of that component. Ideally, the fence should remain substantially parallel to the plane of the saw blade during the cutting operation. Conventional table saw fencing systems fail to adequately address the hassle, annoyance and wasted time usually involved in performing such adjustments.

Increasingly, table saw fencing systems have incorporated digital readout technology to assist in the proper positioning of the fence across the tabletop of the table saw. For example, my U.S. Pat. No. 7,683,935 discloses an adjustable sensor strip for linear digital readouts that is particularly effective for incorporation into a table saw that is being retrofit to include a digital readout for its fencing system, I have determined that in some cases the operator may wish to install an entirely new fence and fence mounting assembly or to purchase an entirely new table saw incorporating a digital readout along with additional features to improve the precision and convenience associated with making adjustments to the positioning of the table saw fence.

SUMMARY OF THE INVENTION

It is therefore an object of the present invention to provide an extremely precise, reliable and convenient adjustable mounting assembly for a table saw fence that allows the fence to be quickly and accurately adjusted and positioned as needed to perform desired woodworking operations on a table saw.

It is a further object of this invention to provide a table saw fence mounting assembly featuring improved incremental and micro-adjustment of the fence relative to the saw blade.

It is a further object of this invention to provide an adjustable fence mounting assembly employing a unique and advantageous one-piece track which uniquely allows not only the fence supporting carriage to be incrementally and more precisely and quickly adjusted, but which also supports an operatively integrated digital readout that accurately reflects the spacing between the saw blade and the fence.

It is a further object of this invention to provide an adjustable fence mounting assembly employing features that enable the fence to be more readily and conveniently adjusted to maintain a substantially parallel orientation to the plane of the saw blade.

It is a further object of this invention to provide an adjustable fence mounting assembly that enables the height of the fence to be conveniently adjusted as needed.

It is a further object of this invention to provide an adjustable fence mounting assembly that incorporates both a digital readout as well as multiple structural features that enable the fence to be conveniently precisely adjusted in even very small incremental amounts.

It is a further object of this invention to provide an adjustable fence mounting assembly that eliminates the time and frustration, as well as the measurement inaccuracies that are often exhibited by conventional table saw fence mounting systems.

This invention results from a realization that improved fine tuning and incremental adjustment of a table saw fence may be quickly and conveniently accomplished by employing a precision manually operated micro-adjustment wheel mechanism featuring a roller component that is operably interengaged with a rail component supported by the track on which the fence is movably mounted. That precision adjustment wheel mechanism can be effectively operated to drive a preferably elastomeric gripping roller along the rail so that positive and extremely accurate incremental adjustments are achieved. This invention results from the further realization that the fence-supporting track and the table saw as a whole are significantly improved by employing the track with a longitudinal rail element that is unitaly joined to the track for supporting both the aforementioned micro-adjustment wheel mechanism and a magnetically attached digital readout that cooperates with an electronic sensor strip mounted to an outer face of the longitudinal rail.

This invention features an adjustable mounting assembly for a table saw apparatus having a rotatable saw blade operably connected to and extending though a slot in the tabletop of the apparatus and further having a fence extending across the tabletop and spaced apart from the saw blade. The mounting assembly includes an elongate track for connecting to and extending along the table saw apparatus.

A carriage is supported by and movable longitudinally on the track for carrying the fence such that the fence extends across the tabletop of the table saw apparatus. An incremental adjustment wheel mechanism is rotatably supported by the carriage and interengages the track. The incremental adjustment wheel mechanism is rotated a selected amount to adjust the position of the carriage on the track and the position of the fence across the tabletop. The track carries an elongate electronic sensor strip containing information representative of the longitudinal position of the carriage on the track and the position of the fence relative to the saw blade. A digital readout is attached to the carriage and movably cooperates with the electronic sensor strip for measuring and displaying the longitudinal position of the carriage on the track and the position of the fence relative to the saw blade.

In a preferred embodiment, the track includes a beam that supports the carriage slkdably thereon and a longitudinal rail that is unitarily joined to the beam. The rail may be rotatably interengaged by the incremental adjustment wheel mechanism and slidably interengaged by the digital readout. The longitudinal rail preferably carries the electronic sensor strip. The rail may include a generally vertical outer face having a longitudinal channel formed therein, which receives the electronic sensor strip.

The incremental adjustment wheel mechanism may include an outer manually engageable wheel section supported outside of the rail, an inner retaining wheel section interconnected to the outer wheel section and interengaged with the track in a longitudinal slot interiorly of the rail. The wheel mechanism may also include an intermediate roller component interconnected between the inner and outer wheel sections and circumferentially and rotatably interengaging a generally horizontal upper surface of the rail. The intermediate roller component may include an annular elastomeric element for frictionally gripping the rail as the roller component rotates over the rail.

The adjustment wheel mechanism may include a threaded support shaft connected to the carriage and having an axially eccentric portion that supports the manually engageable outer wheel section. The adjustment wheel mechanism may further include a fastening nut threadably engaged with the threaded support shaft. The fastening nut may be selectively loosened on the threaded support shaft relative to the carriage and the manually engageable outer wheel section may be sufficiently snugly interengaged with the axially eccentric portion of the shaft such that rotating the outer wheel section turns the shaft to adjust the height of the carriage relative to the track. The fastening nut may alternatively be selectively tightened on the shaft and against the carriage such that rotating the outer wheel section about the axially eccentric portion of the shaft incrementally adjusts the position of the carriage longitudinally on the track.

A plurality of angular adjustment elements may be provided for interconnecting the fence to the carriage. Each such element may be received through a respective enlarged hole in a plate secured to the fence and through a corresponding hole in the carriage. The enlarged hole is wide enough to allow the plate to be repositioned on the carriage to adjust the angle at which the fence extends across the tabletop from the track. The adjustment elements may include respective screws or bolts that are selectively interengaged by respective nuts to fasten the plate to the carriage.

The track may include a longitudinal carriage retention channel formed proximate an interior longitudinal face in the beam of the track. The channel may receive a depending distal flange of the carriage. The depending distal flange may carry at least one laterally adjustable boss or nut disposed to reduce clearance between the depending flange and a back wall of the carniage retention channel. This maintains the fence substantially perpendicular to the track and parallel to the saw blade as the carriage and the fence are moved along the track. The track may also include a longitudinal table mounting channel formed in the interior face of the track for receiving one or more connectors to secure the track to the table saw apparatus.

One of the carriage and the distal readout may carry a magnet. The other of the carriage and the digital readout may include a magnetically attracted material. This enables the digital readout to remain releasably secured to and movable with the carriage during operation of the assembly.

A pair of generally aligned fence rollers may be rotatably connected to and operably exposed from a bottom surface of the fence. This facilitates movement of the fence across the tabletop and specifically reduces interference by an underlying T-slot or other structural features of the table saw with operation of the fence connected rollers.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
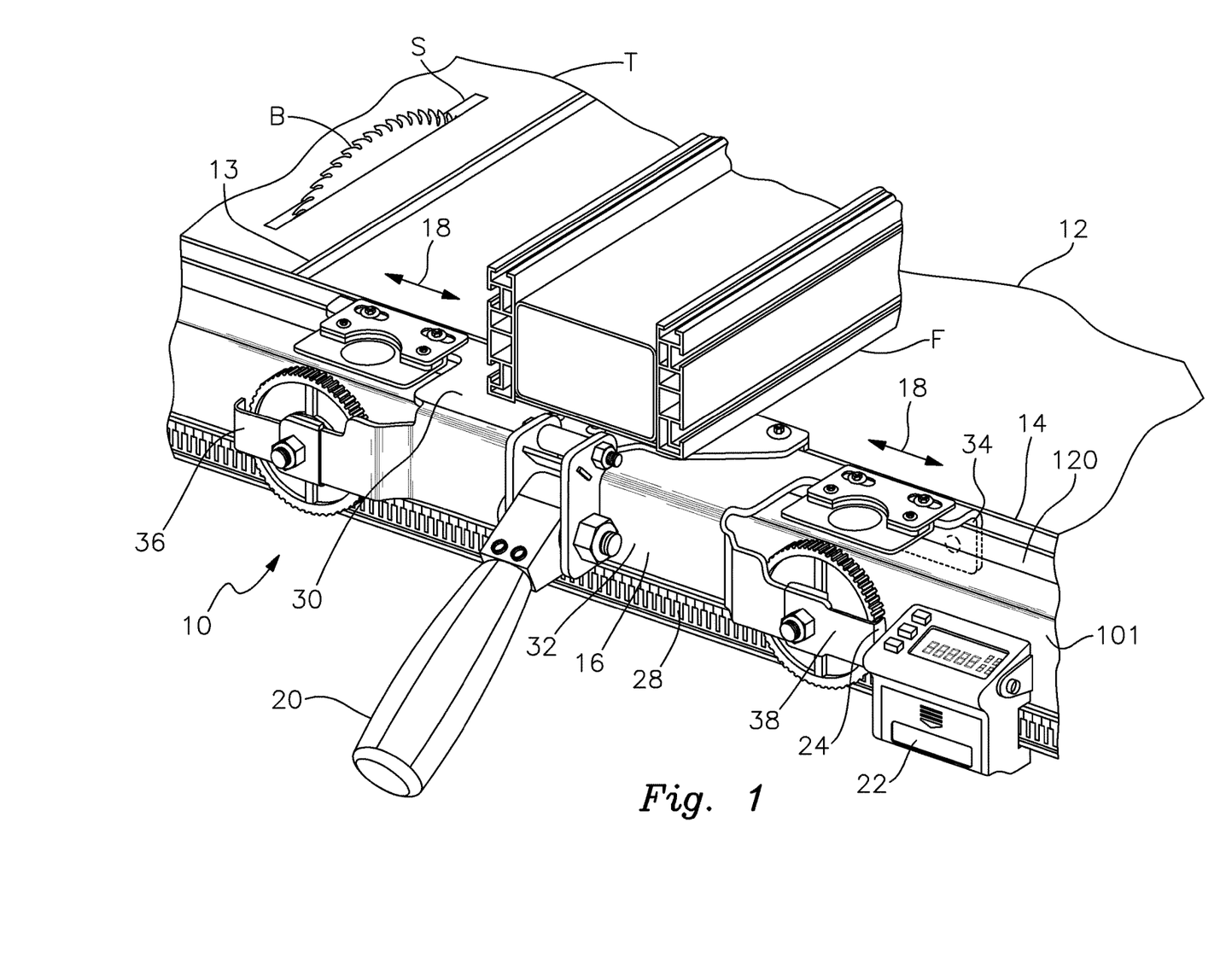
FIG. 1 is a fragmentary perspective view of a preferred adjustable mounting assembly for a table saw fence according to this invention.

There is shown in FIG. 1 an assembly 10 for adjustably mounting a fence F on a table saw T. The table saw may comprise any type, variety or brand of table saw used in woodworking applications. The specific construction of the saw itself, as well as the types of cutting operations for which the saw may be used may vary and do not constitute limitations of this invention. As is conventionally known, table saw apparatus T includes a tabletop 12 that is supported by a base, stand or legs, which are not shown. A saw blade B is operatively connected to the apparatus and extends in a conventional manner though a slot S in tabletop 12. Other standard features such as a T-slot 13 and electronic saw controls (e.g. an ON/OFF switch and motor, not shown) may be included in table saw apparatus T in a manner that will be known to persons skilled in the art.

Table saw fence F is supported by assembly 10 to extend across tabletop 12. Fences are widely employed with table saws to enable proper positioning of the lumber to be cut on the tabletop of the saw. Typically, the fence is positioned so that is longitudinal side faces are generally parallel to the plane of blade B. Fence F is typically composed of a durable metal or metal alloy (hereinafter simply "metal". The fence may employ an elongate extrusion which may have assorted configurations within the scope of this invention. Other than features that facilitate movement of the fence across the tabletop, which are described in greater detail below, the construction of fence F is largely conventional and will be understood to persons skilled in the art.

Assembly 10 includes an elongate and preferably unitary track 14 that is secured to a side edge of tabletop 12 in a manner that is described more fully below. Typically, the track extends along a respective side edge of tabletop 12 that is generally perpendicular to the plane of saw blade B. The track includes a unique, one-piece and preferably extruded metal construction that is again described more fully below.

Figure 2:
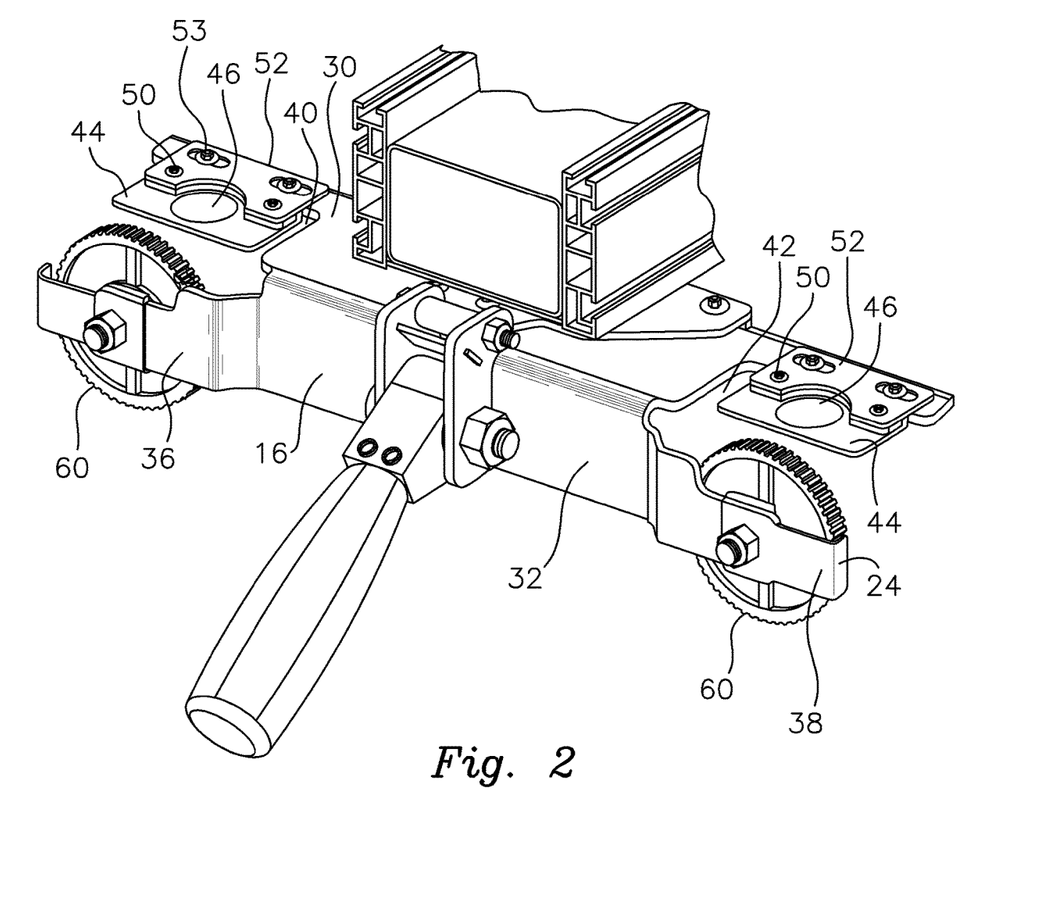
FIG. 2 is a fragmentary perspective view of the carriage of the adjustable mounting assembly with a table saw fence supported thereon.
Figure 3:
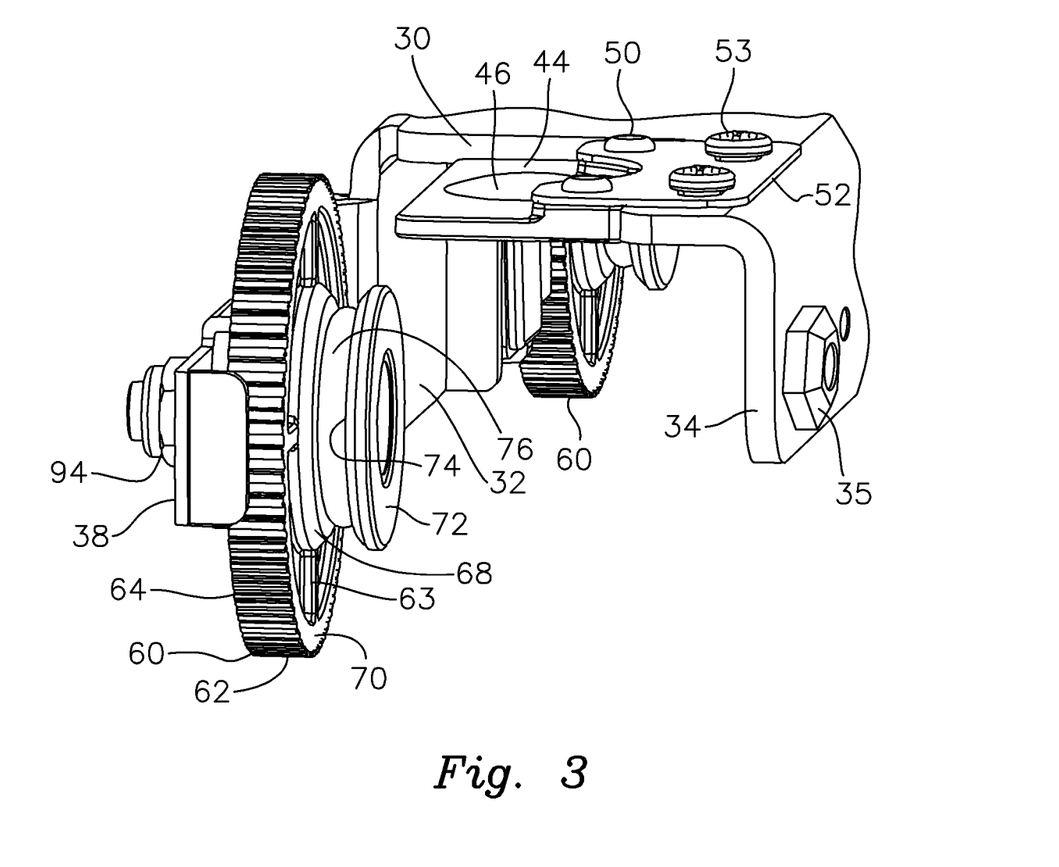
FIG. 3 is a fragmentary perspective view of a representative end of the carriage and particularly depicting the manner in which the incremental adjustment wheel mechanism is supported by the carriage.

A preferably metal carriage 16, which is shown and described more fully in FIGS. 2 and 3, is mounted to track 14 and movable along the track as indicated by double-headed arrow 18. Carriage 16 supports fence F and the fence is adjustably secured to the carriage as described below. The carriage further comprises a pair of typically integrally attached extension arms 36, 38 that support respective incremental adjustment mechanisms as also described below. A conventional locking handle 20 is operatively connected to carriage 16. The locking handle is constructed and operated in a known manner (typically by lowering the handle) to lock carriage 16 and supported fence F at a selected position along track 14 and extending across tabletop 12. Assembly 10 further includes a digital readout device 22, which is magnetically attached to an inwardly turned or bent tab 24 formed at one end of extension arm 38 of carriage 16. An analogous magnetically attracted tab is formed on opposite extension arm 38 for selectively securing the digital readout to the opposite end of the carriage. Digital readout 22 is also slidably and operatively interengaged with track 14 in a manner reflected below and cooperates with an electronic (capacitive) sensor strip 28 in order to measure and display the position of the carriage and supported fence on track 14 and tabletop 12.

Carriage 16 is further depicted in FIGS. 2 and 3. In particular, carriage features a folded metal plate having a horizontal upper portion 30 and unitarily attached outer and inner depending portions 32 and 34 that depend from outer and inner edges respectively of horizontal portion 30. As previously described, adjustment wheel supporting extension arms 36 and 38 extend in opposite directions from outer carriage portion 32. A pair of pockets 40 and 42 in top portion 30 of carriage 16 accommodate respective lenses 44. Each lens 44 has a concave magnifying portion 46 that allows for magnified viewing of traditional scalar indicia (not shown) formed along the track in a manner described below. Each lens 44 is attached by screws 50 to a metal adjustment plate 52 which is itself fastened to portion 30 of carriage 16 by screw 53. Slots in the adjustment plate allow the lens 44 to be positionally adjusted relative to screw 53 for viewing the scale on the track.

Figure 4:
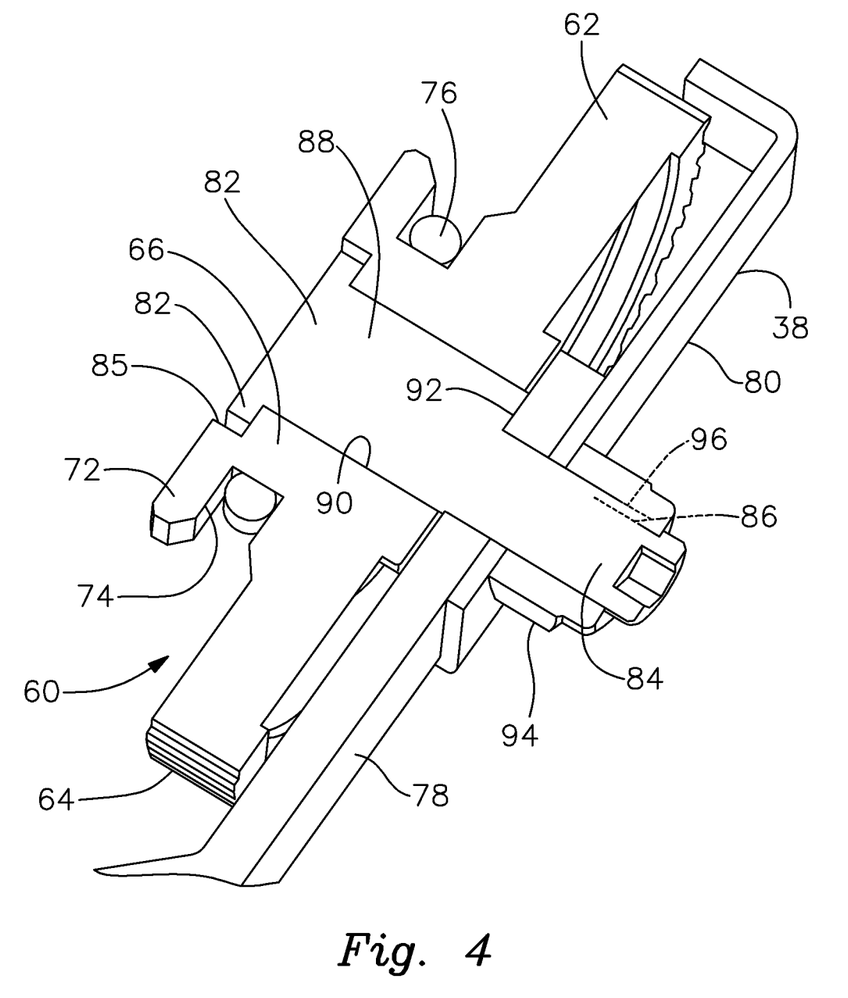
FIG. 4 is a cross sectional view of a representative incremental adjustment wheel mechanism.

Each of extension arms 36 and 38 of carriage 16 rotatably supports a respective micro or incremental adjustment wheel mechanism 60. A representative one of the wheel mechanisms 60, i.e., the wheel mechanism supported by extension arm 38, is shown in FIGS. 3 and 4. The following description applies analogously to extension 36 and the adjustment wheel mechanism attached thereto. Each wheel mechanism 60 includes a manually engageable outer wheel section 62 having a relatively large diameter and a toothed or knurled circumferential surface 64. More particularly, a hub 66 is interconnected by radial spokes 63 to an outer ring 70, which includes toothed circumferential surface 64. An inner retaining wheel section 72 is unitarily interconnected to hub 66 and has a diameter that is smaller than that of outer wheel section 62. In alternative embodiments, the inner retaining wheel section 72 may have a diameter that is somewhat larger than that depicted or even substantially the same as that of wheel 62. The unitarily connected outer wheel section 62, inner wheel section 72 and hub 66 collectively form a unitary wheel piece 68, which typically comprises a durable metal material of the type normally used in machine tool and woodworking applications. In alternative embodiments, the one-piece wheel (and indeed other components of the assembly) may employ durable synthetic materials.

An annular groove 74 is formed about hub 66 between outer wheel section 62 and inner wheel section 72. Groove 74 receives an annular O-ring 76 that is preferably composed of an elastomeric material providing an effective frictional gripping surface for circumferentially engaging the track as described below. The O-ring therefore effectively defines a tire or roller of wheel mechanism 60, which is disposed between outer wheel section 62 and inner wheel section 72.

As best depicted in FIG. 4, extension arm 38 includes a pair of overlapping segments 78 and 80. Wheel mechanism 60 includes an eccentric support shaft 82 for rotatably supporting wheel sections 62 and 72, as well as intermediate roller 76 on extension arm 38 of the carriage. Specifically, shaft 82 includes a relatively small diameter portion 84 containing circumferential threads 86 and an axially offset, relatively large diameter eccentric portion 88. A head 83 of shaft 82 is received in a recess 85 formed in inner wheel section 72. Shaft 82 is received by a central opening 90 formed through wheel hub 66. End 92 of eccentric shaft portion 88 engages segment 78 of extension arm 38. The smaller diameter portion 84 of shaft 82 is received through aligned openings formed in overlapping segments 78 and 80 of extension arm 38. Shaft 82 is secured to extension arm 38 by an adjustable nut or other form of fastener 94. Nut 94 includes interior threads 96 that interengage exterior threads 86 on shaft portion 84. This allows nut 94 to be selectively tightened against segment 80 of arm 38 or, alternatively, loosened relative to the extension arm.

Eccentric portion 88 of shaft 82 has a diameter that is very close in size to, but minutely smaller than the interior diameter of the opening formed through hub 66. The frictional interengagement (i.e. the snugness of the fit) between unitary wheel piece 63 and frictionally engaged shaft 82 is such that the wheel piece will rotate in unison with shaft 82 when the shaft is loosely connected and rotatable relative to arm 38 However, when the shaft is fixed and restricted from rotating relative to arm 38, wheel piece 63 will rotate about portion 88 of shaft 82. Accordingly, when nut 94 is loosened on shaft portion 84, wheel piece 63 may be rotated within the carriage and the frictional interengagement between wheel piece 63 and shaft 82 will be sufficient to rotate shaft 82 within the extension arm 38. Alternatively, if nut 94 is tightened against arm 38, this locks shaft 82 in place and prevents it from rotating. The interior diameter of wheel piece 63 is sufficiently greater than the exterior diameter of eccentric shaft portion 88 that wheel piece 63 will rotate about the locked shaft 82. The foregoing structure enables the carriage and supported fence to be selectively raised and lowered or alternatively incrementally adjusted along the tabletop of the table saw in the manner described more fully below.

Figure 5:
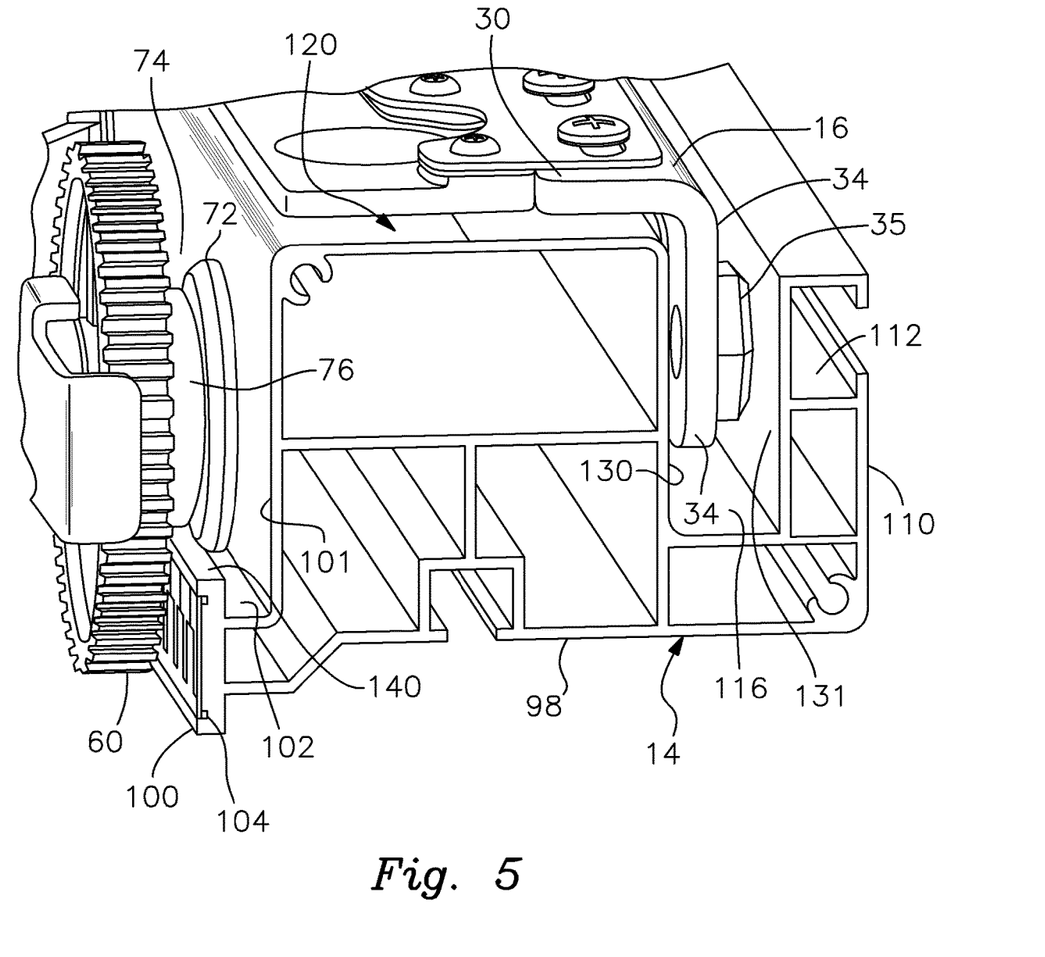
FIG. 5 is fragmentary perspective view of a segment of the one-piece track extrusion as operatively engaged by the carriage and the incremental adjustment wheel mechanism.
Figure 6:
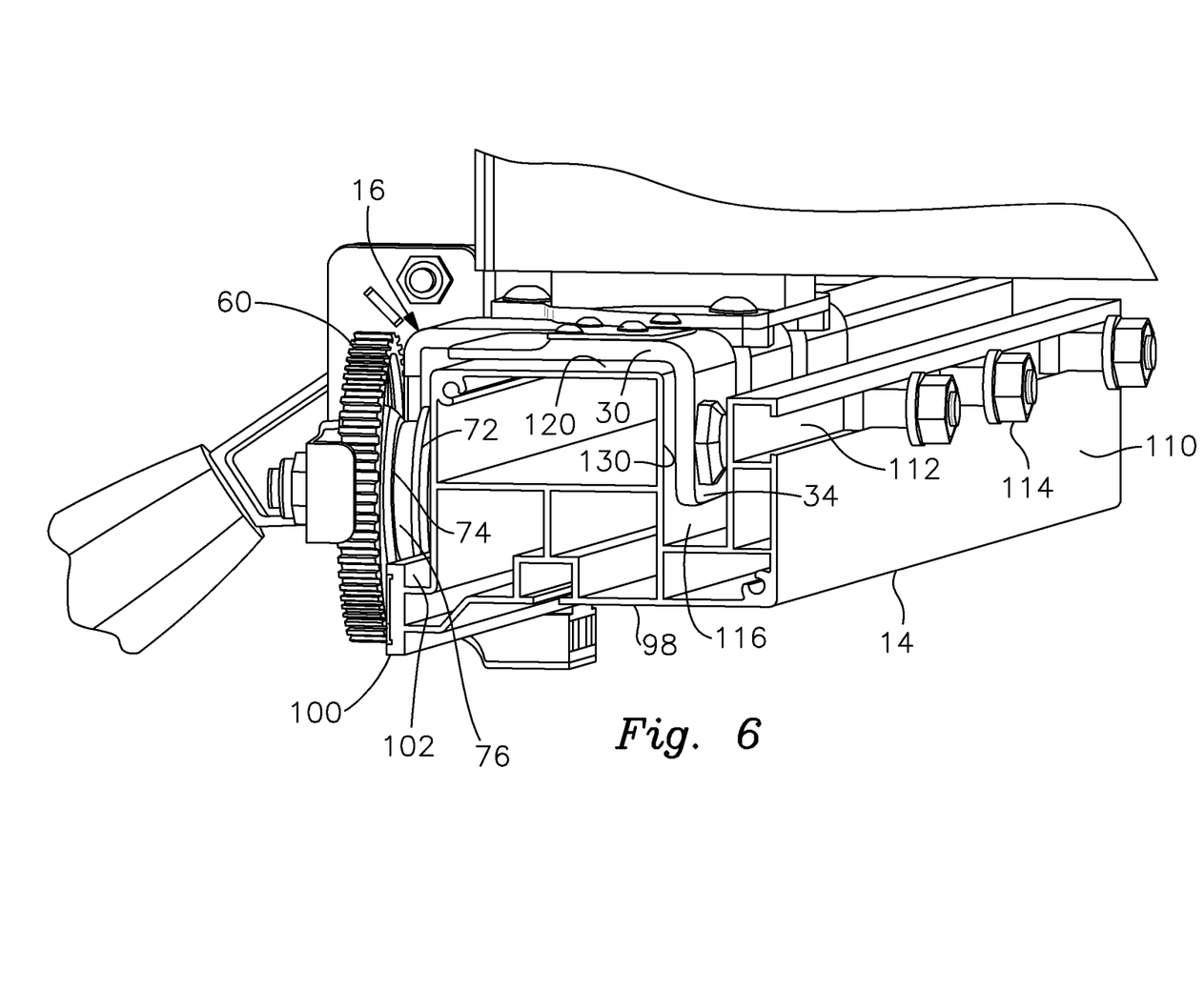
FIG. 6 is an alternative perspective view of the track and the interengaged carriage and adjustment wheel mechanism; portions of the supported fence and fence locking handle are also shown.
Figure 7:
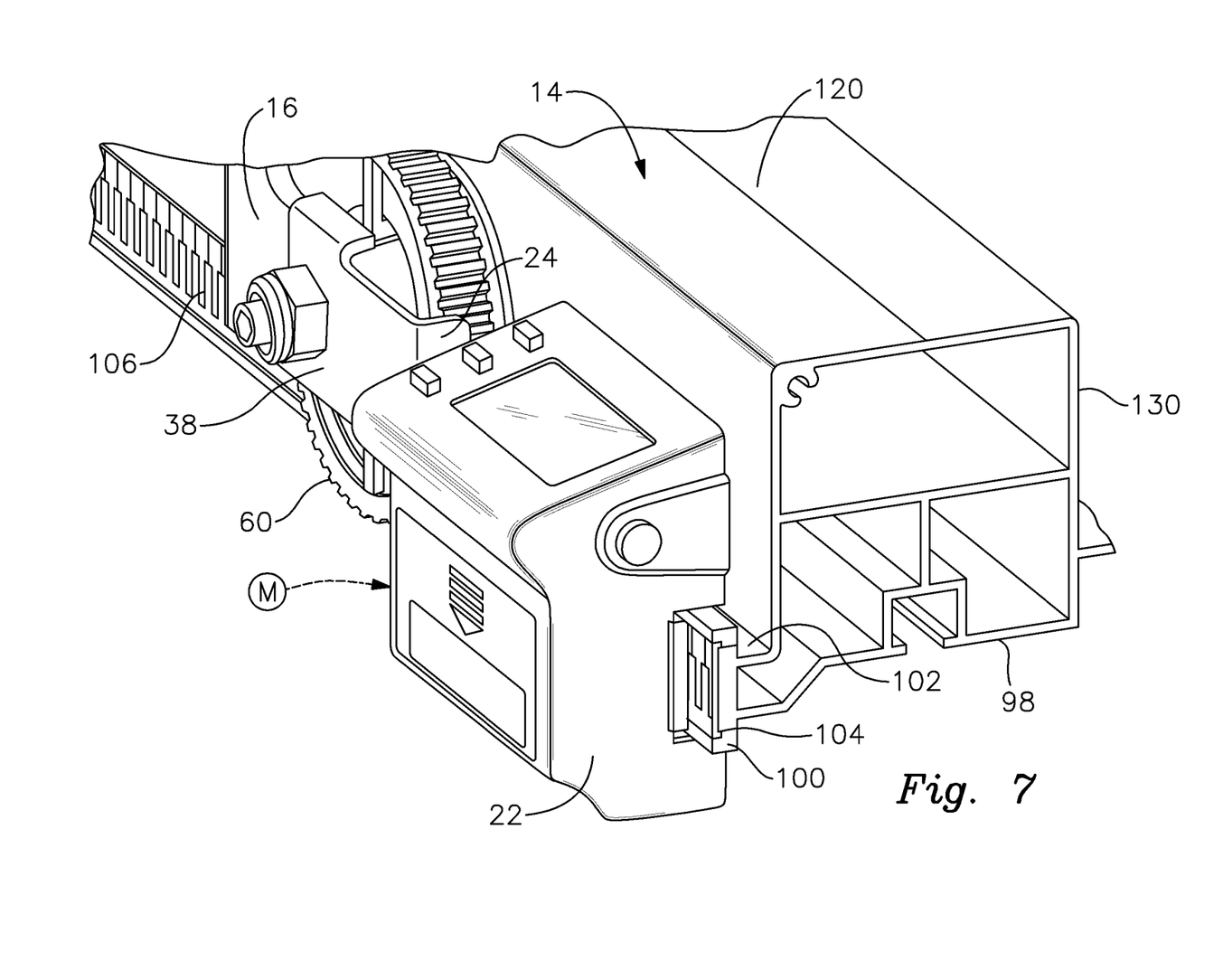
FIG. 7 is a fragmentary perspective view of the track and specifically depicting a representative one of the adjustment wheel mechanisms and the digital readout operatively mounted on the unitary rail of the track, and with the digital readout cooperatively interengaging an electronic sensor strip carried by the rail.

FIGS. 5 and 6 illustrate carriage 16 operably mounted to track 14. As also shown in FIG. 7, track 14 includes an elongate one-piece component that is preferably formed by known manufacturing processes such as extrusion. The track includes a longitudinal beam 98 having a number of interior ribs and walls that strengthen and improve the structural integrity of the track. Various alternative configurations may be employed within the scope of the invention. Significantly, track 14 features an elongate rail that is unitarily formed with beam 98 of track 14 such that the beam and the rail preferably consist of a single piece. More particularly, rail 100 extends longitudinally along the beam and is carried outwardly of an outer face 101 and proximate the bottom of the beam. Rail 100 may be positioned alternatively and elsewhere on the track in other embodiments of this invention. In certain versions, the rail may be a separate piece that is attached to beam 98. Nonetheless, a one-piece construction is preferred. As shown in FIGS. 5-7, a longitudinal slot 102 is formed between rail 100 and outer face 101 of beam 14. An outer face of rail 100 includes a longitudinal channel 104 for receiving an electronic sensor strip 106. This may comprise a capacitive sensor strip, as described in U.S. Pat. Nos. 7,207,121 and 7,683,935, which contains information representative of the longitudinal position of the carriage on the track. This sensor strip is used as described below to obtain precise and incremental measurements when adjusting the position of the fence on the table saw.

Interior longitudinal face 110 of track 14 includes a longitudinal mounting receptacle 112. This receptacle receives connectors 114, FIG. 6, for securing track 14 to table saw T (FIG. 1). For example, each of connectors 114 includes a head that is slidably received and retained in longitudinal receptacle 112. The opposite end of each connector includes threads which are engaged with respective nut and washer combinations to secure the track to the tabletop or other components of the table saw.

Track 14 also includes a longitudinal recess 116, which is formed between mounting receptacle 112 and beam 98. Recess 116 is designed for receiving depending portion 34 and attached spacer nut 35 when carriage 16 is mounted on track 14. The adjustable nylon nuts or other form of laterally adjustable bosses are typically mounted to "PEM" style studs carried by depending portion 34. The nuts are adjusted and held in place by respective spring washers to provide as small a clearance or spacing as possible between the nuts and opposite wall 131 of recess 116. As described more fully below, this helps to keep the carriage from wobbling and misaligning the fence during operation of the adjustable mounting assembly 10.

Carriage 16 and its attached components are installed on track 14 as further shown in FIGS. 5-7. The carriage is slidably interengaged with beam 98 of track 14 such that upper portion 30 of carriage 16 engages top surface 120 of beam 98. Depending portions 32 and 34 of carriage 16 respectively interengage outer beam face 101 and inner beam face 130 located in recess 116 of track 16. See also FIG. 1. Each incremental adjustment wheel mechanism 60 is supported such that the outer wheel section 62 is disposed outwardly of rail 100 and inner retaining wheel section 72 is positioned in the longitudinal slot 102 between rail 100 and beam wall 101. Wheel section 72 preferably rolls along the floor of slot 102. Each roller 76 circumferentially interengages an upper edge 140 of longitudinal rail 100. Roller 76 acts as a tire when it is moved or rolled along the upper edge of the rail in the manner described below.

As depicted in FIGS. 1 and 7, digital readout 22 is slidably mounted to longitudinal rail 100 such that the digital readout operatively cooperates with sensor strip 106 in a known manner to provide precise and incremental measurements reflecting the position of the fence relative to the saw blade. The cooperative interengagement between the digital readout and the sensor strip may be analogous to that described in U.S. Pat. No. 7,683,935. In the present invention, digital readout 22 carries a magnet M (depicted schematically in FIG. 7), which is mounted to a side wall or a casing of the readout 22. As previously indicated, extension arm 38 of carriage 16 includes a perpendicularly bent tab 24 composed of magnetically attracted metal. This secures the digital readout to tab 24 and carriage 16 as shown in FIG. 7 and as further reflected by line 26 in FIG. 1. As a result, readout 22 is securely attached to the carriage and slides back and forth with the carriage along rail 100 whenever carriage 16 is moved along track 14. The readout in turn cooperates with the electronic sensor strip 106 to provide positional measurements of the carriage and attached fence.

Figure 8:
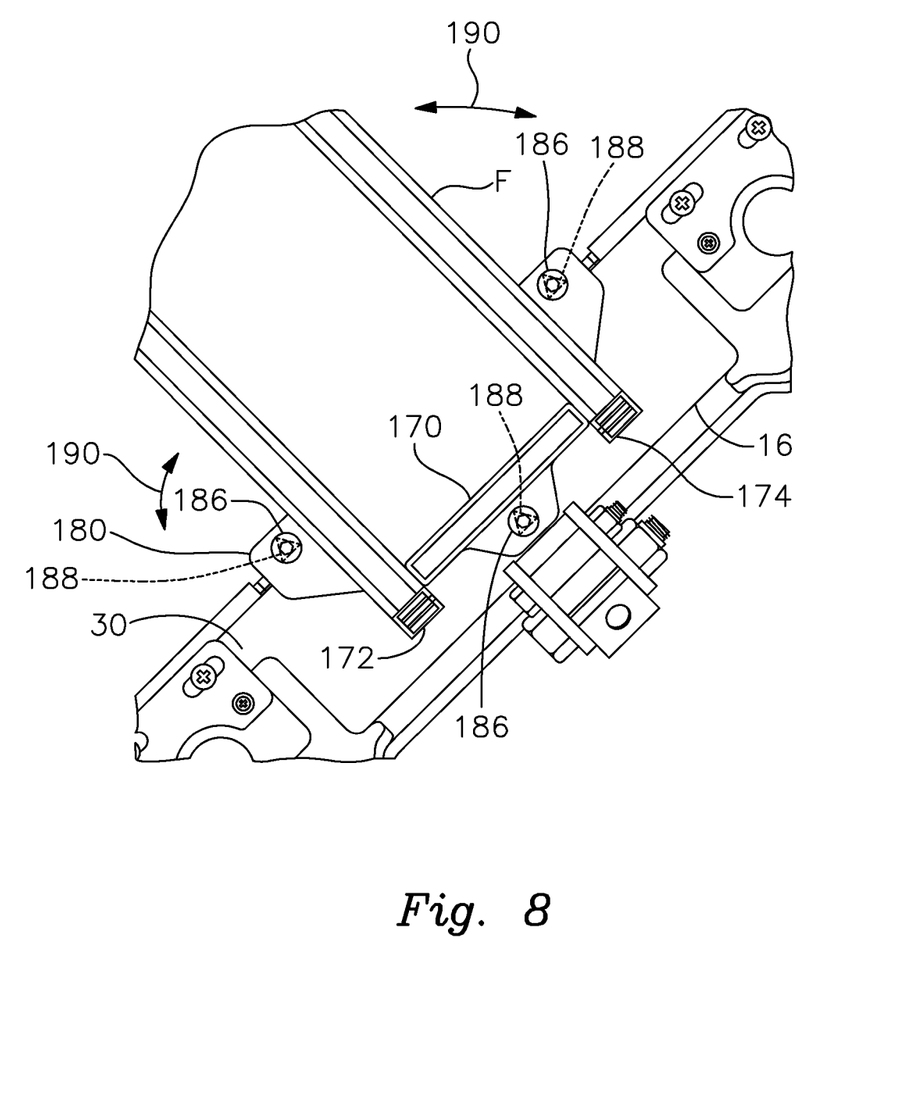
FIG. 8 is a fragmentary top view of the fence as mounted to the carriage and particularly depicting the interconnection between the fence and the carriage that permits the angle of the fence to be adjusted across the tabletop of the table saw.
Figure 9:
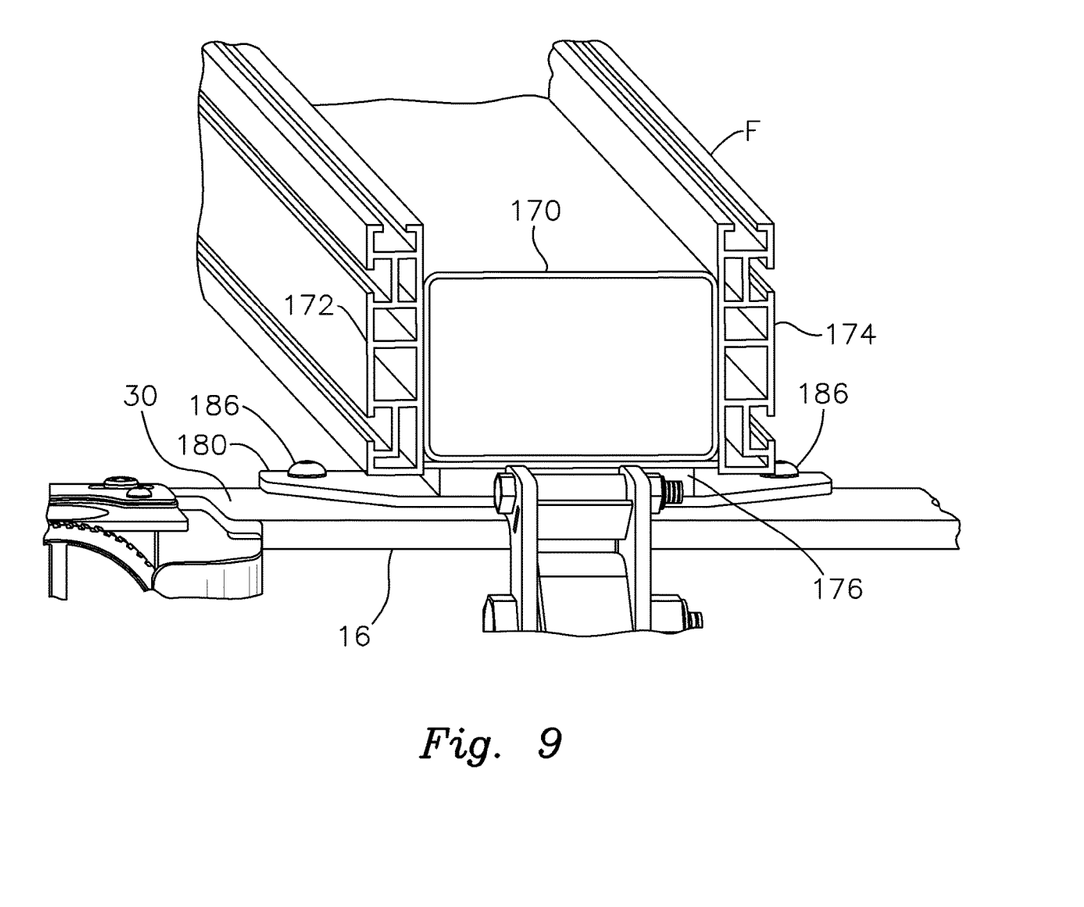
FIG. 9 is a fragmentary perspective view of the inner end of the fence and underlying carriage.
Figure 10:
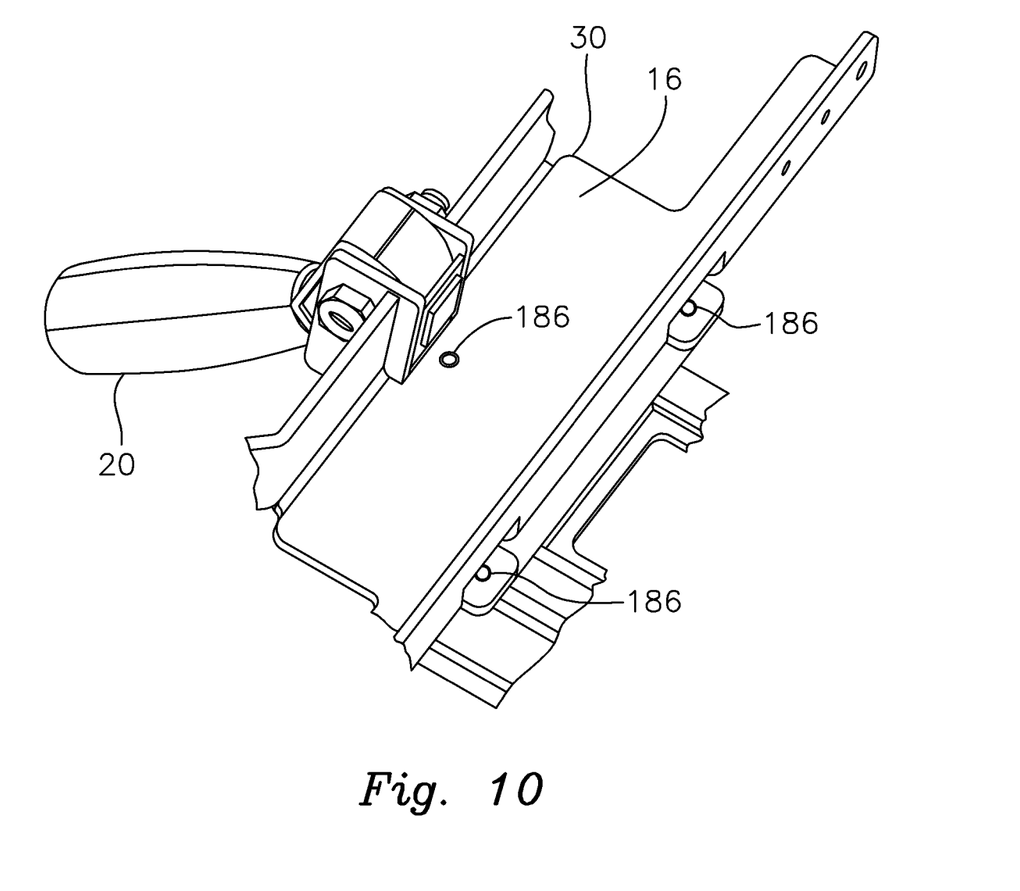
FIG. 10 fragmentary bottom perspective view depicting the screws that adjustably secure the fence to the carriage extend through fastening holes formed in the bottom of the carriage.

FIGS. 8-10 show additional structure that allows the angular orientation of fence F to be adjusted. Fence F includes a central tube 170 and a pair of side extrusions 172 and 174. Central tube 170 is attached to an underlying base 176. This represents simply one way in which the fence may be constructed. Various alternative fence constructions known in the art may be employed with the mounting assembly of this invention. Fence F is itself secured to a mounting plate 180 of mounting assembly 10. Plate 180 lays flat on upper surface 30 of carriage 16. A plurality of screws or bolts 186, or other types of adjustment elements are received through triangular or alternatively configured enlarged openings 188 in respective flanges of plate 180. Each of the adjustment elements interengages a corresponding hole in underlying portion 30 of carriage 16. Because the flanges include the enlarged, triangular holes 188 this allows the supportive plate 180 and the attached fence F to be angularly adjusted as shown by double headed arrows 190. Accordingly, fence F may be finely adjusted as required to maintain a perpendicular relationship with the track and a substantially parallel relationship with the saw blade.

Figure 11:
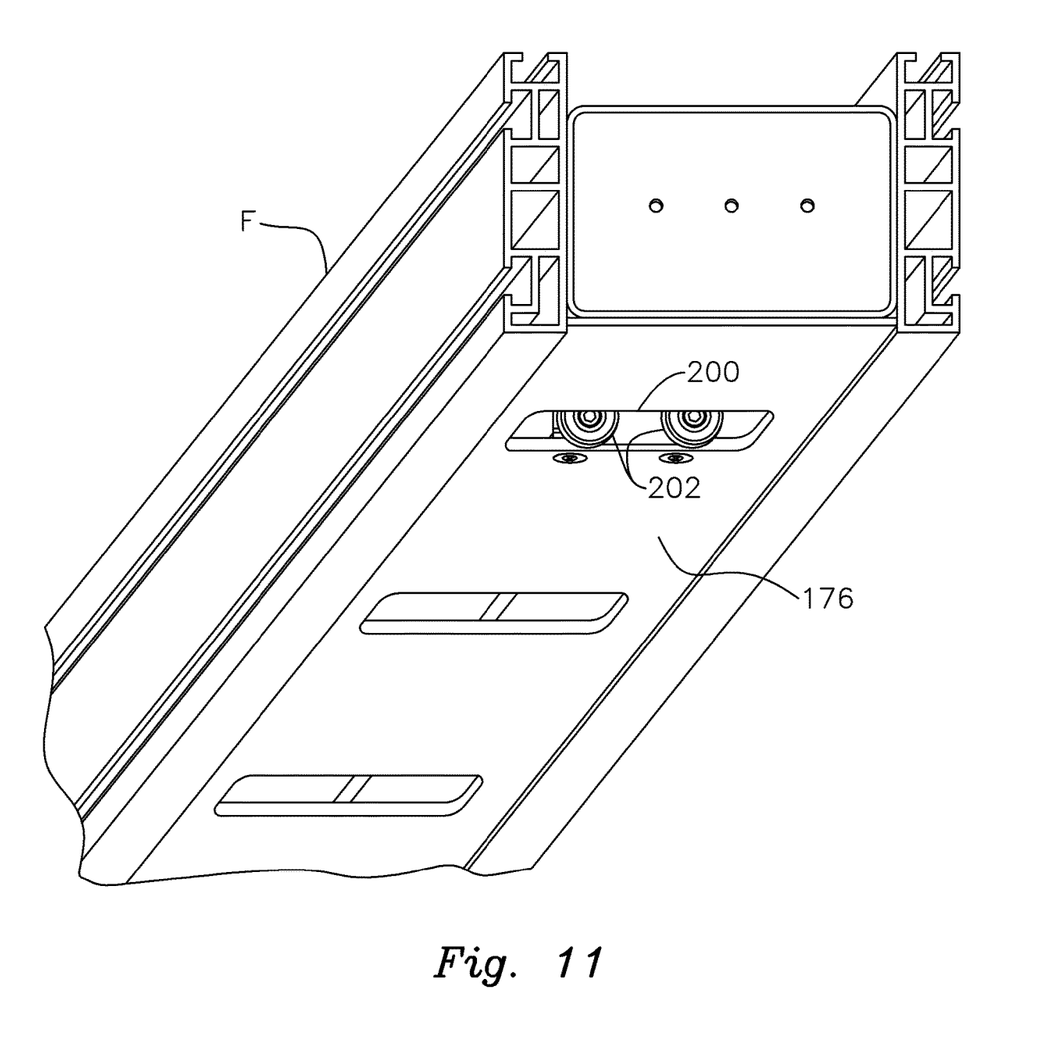
FIG. 11 is a fragmentary lower perspective view depicting a pair of aligned rollers exposed through a slot on the bottom of the fence for allowing the fence to be smoothly adjusted across the tabletop of the table saw.

As shown in FIG. 11, fence F may further include an opening 200 in the fence bottom or base 176. A pair of generally aligned fence rollers 202 are mounted within the fence. Rollers 202 depend from the fence through slot 200 and are operatively exposed below fence bottom 176. The wheels engage the tabletop 12, FIG. 1, as the fence is moved with the carriage 16 along track 14. These wheels facilitate movement of the fence over the tabletop 12. They are particularly effective when engaging a T-slot or similar feature of the table saw as described below.

In operation, assembly 10 greatly facilitates the adjustment of fence F on tabletop 12 of table saw T. This assembly also permits reliable and highly precise measurements to be taken in a quick and convenient manner. Prior to usage, assembly 10 is assembled and installed on the table in the above-described manner. Carriage 16, incremental adjustment wheel mechanisms 60 and digital readout 22 are installed on the track 14 such that rollers 76 interengage the upper edge of rail 100 and digital readout 22 likewise slidably interengages rail 100 and operatively cooperates with sensor strip 106, while remaining magnetically attached to carriage 16. Precise and reliable adjustments of the fence may then be effected quickly and conveniently. For example, to vertically adjust the height of the fence, the operator simply loosens fastening nut 94 on wheel mechanism shaft 82. As previously described, this permits the manually engageable outer wheel section 62 to turn support shaft 82 within arm 38. The eccentric rotation of the shaft causes the wheel mechanism to successively raise and lower the extension arm and the entire carriage 16 so that the height of the carriage and attached fence can be adjusted as needed.

When the proper height adjustment has been achieved or in cases where no change of height is needed, lock nut 94 may be tightened to lock shaft 82 in place on arm 38. As a result, wheel section 62 may be manually engaged and rotated so that it turns about the shaft portion 88 without rotating the shaft 82 in the extension arm. Incremental or micro-adjustments of the fence can then be made. Specifically, the operator can turn wheel section 62 even a very small amount. This causes roller 76 to roll reliably along rail 106. Inner retaining wheel section 72 holds the wheel mechanism securely in interengagement with the rail and thereby track 14. The frictionally effective circumferential gripping surface of roller 76 enables the operator to move the carriage precisely and positively along rail 100 without any undue slippage, sticking or erratic operation. At the same time, the readout 22 cooperates with sensor strip 100 to make accurate incremental measurements reflecting the distance between the fence and the saw blade. Such measurements are displayed by readout 22. Scalar indicia (not shown) may also be printed on the upper edge 140 of rail 100 for viewing by the operator through lenses 44. The foregoing incremental adjustments can be conveniently made by a selected one of the adjustment wheel mechanisms 60 carried proximate respective ends of the extension arms 36, 38 supported by carriage 16.

Before carriage 16 is adjusted in the foregoing manner, adjustment bosses or nuts 35 are laterally adjusted to minimize the clearance between the carriage and wall 131 of track 14. As previously indicated, this reduces undue wobbling of the carriage as it is moved along the track, which further reduces the possibility that the fence will not be parallel with the saw blade following movement of the carriage.

The angle of fence F is adjusted, when needed, by positioning pins 186 within enlarged holes 188 of mounting plate 180, see FIGS. 8-10. Such repositioning is typically performed before the pins are tightened to secure mounting plate 180 to carriage 16.

It should be understood that carriage 16 and fence F may also be moved manually and in a more or less conventional manner by pushing the carriage along the track and without manually engaging and turning the adjustment wheel mechanisms 60. Nonetheless, the use of the incremental adjustment wheels allows extremely precise incremental movements to be quickly, conveniently and accurately accomplished.

Assembly 10 provides for a number of advantages over the prior art. The adjustment wheel mechanisms provide for much more reliable and convenient incremental or micro-adjustment of the fence along the tabletop. The wheel adjustment mechanism utilizes a large diameter manually engageable wheel section and an interior wheel section for reliably retaining the wheel mechanism on a rail of the mounting track. Applicant's intermediate roller features an improved, extremely effective positive interengagement between the roller and the rail that yields precise measurements much faster than are provided by previous systems. Multiple locking operations are not required. The disclosed assembly also provides for novel ways of adjusting the height and angular orientation of the fence, which are not previously disclosed.

The disclosed track profile featuring a rail unitarily connected to the carriage supporting track is particularly beneficial. The rail disclosed herein not only offers smooth and reliable support for applicant's incremental adjustment wheel mechanisms, it also provides effective sliding support for an attached digital readout. Indeed, the track and adjustment wheel mechanism and readout mounted thereon comprise an optionally available integrated product that has heretofore never been available for the woodworking industry in a complete and integrated package. The present assembly provides not only a novel track, it also provides for an incremental adjustment wheel mechanism and integrated readout/sensor strip that may be used effectively and in combination with such a track. The adjustment mechanism, sensor strip and readout are all uniquely interengaged with and operate on the track rail. Woodworking efficiency, accuracy and convenience are thereby significantly improved.

Although specific features of the invention are shown in some of the drawings and not others, this is for convenience only, as each feature may be combined with any and al of the other features in accordance with this invention.

Other embodiments will occur to those skilled in the art and are within the following claims:

What is claimed is:

1. An adjustable mounting assembly for a table saw apparatus, the table saw apparatus having a rotatable saw blade operably connected to and extending through a slot in a tabletop of the apparatus and the table saw apparatus further having a fence extending across the tabletop and spaced apart from the saw blade, said assembly comprising:
    an elongate track for connecting to the table saw apparatus;
    a carriage supported by and movable longitudinally on said track for carrying the fence such that the fence extends across the tabletop of the table saw apparatus;
    an incremental adjustment wheel mechanism rotatably supported by said carriage and interengaging said track, said incremental adjustment wheel mechanism being rotated a selected amount to move said carriage longitudinally on said track to a selected position on said track and move the fence to a corresponding selected position across the tabletop;
    said incremental adjustment mechanism including a roller and said track including a longitudinal rail having an upper edge underlying said roller, said roller circumferentially engaging and being rollable along said upper edge of said rail to rollably support said carriage on said track;

said track carrying an elongate electronic sensor strip containing information representative of said selected position of said carriage longitudinally on said track and said corresponding selected position of the fence across the tabletop; and a digital readout attached to said carriage and movably cooperating with said electronic sensor strip for measuring and displaying said selected position of said carriage on said track and said corresponding selected position of the fence across the tabletop; said track including a longitudinal beam for supporting said carriage slidably thereon, said longitudinal rail being unitarily connected to and supported by said beam, said upper edge of said rail being flat and rotatably interengaged by said roller of said adjustment wheel mechanism and said rail being slidably interengaged by said digital readout.

2. The assembly of claim 1 in which said longitudinal rail carries said electronic sensor strip.

3. The assembly of claim 2 in which said rail includes a longitudinal channel formed therein, which channel receives said electronic sensor strip.

4. The assembly of claim 1 in which said wheel mechanism includes a manually engageable outer wheel section supported outside of said rail, an inner retaining wheel section interconnected to said outer wheel section and interengaged with said track in a longitudinal slot interiorly of said rail, said roller being interconnected between said inner and outer wheel sections.

5. The assembly of claim 4 in which said roller includes an annular elastomeric element for frictionally gripping said rail as said roller rotates over said rail.

6. The assembly of claim 1 in which said adjustment wheel mechanism includes a threaded support shaft connected to said carriage, said threaded support shaft having an axially eccentric portion that supports a manually engageable outer wheel section and said adjustment wheel mechanism further including a fastening nut threadably engaged with said shaft, said fastening nut being selectively loosened and tightened on said threaded shaft relative to said carriage, and said manually engageable outer wheel section being frictionally interengaged with said axially eccentric portion of said shaft such that rotating said outer wheel section, when said fastening nut is loosened on said threaded shaft relative to said carriage, adjusts the height of said carriage relative to said track, and turning said outer wheel section, when said fastening nut is tightened on said threaded shaft relative to said carriage, adjusts the longitudinal position of said carriage on said track.

7. The assembly of claim 1 further including a plurality of angular adjustment elements for interconnecting the fence to said carriage, said adjustment elements being received through respective enlarged holes in a plate secured to the fence, which enlarged holes are wide enough to allow said plate to be repositioned relative to said angular adjustment elements to adjust the angle at which the fence extends across the tabletop from said track.

8. The assembly of claim 1 in which said carriage includes a folded plate having a horizontal upper portion and unitarily attached and spaced apart inner and outer portions that depend from said horizontal upper portion, and in which said track includes a longitudinal carriage retention recess formed proximate an interior longitudinal face of said track, said recess receiving said inner portion of said carriage, said inner portion carrying at least one laterally adjustable boss disposed and reducing a clearance between said inner portion of said carriage and a back wall of said channel to maintain the fence substantially parallel to a plane of the saw blade as said carriage and the fence are moved along said track.

9. The assembly of claim 1 in which said track includes a longitudinal mounting channel formed in an interior face of said track for receiving one or more connectors to secure said track to the table saw apparatus.

10. The assembly of claim 1 in which one of said carriage and said digital readout carries a magnet and the other of said carriage and digital readout includes a magnetically attracted material for releasably securing said digital readout to said carriage or said readout.

11. The assembly of claim 7 in which each adjustment element includes exterior threads for interengaging corresponding interior threads of a respective fastening nut to secure said plate to said carriage.

12. The assembly of claim 1 further including a pair of generally aligned rollers rotatably connected to and operably exposed from a bottom of the fence to facilitate movement of the fence across the tabletop.

13. The assembly of claim 1 in which said incremental adjustment wheel mechanism further includes an outer wheel section and an inner wheel section axially interconnected to said roller, said inner wheel section being engageable with and rollable along an underlying floor of a longitudinal slot in said track, which slot is formed in said track adjacent to said rail such that said inner wheel section further supports said carriage on said track and restricts lateral movement of said outer wheel section and roller component relative to said longitudinal rail.

14. The assembly of claim 13 in which said upper edge of said rail and said floor of said slot include flat horizontal surfaces engaged circumferentially by said roller component and said inner wheel section respectively.

15. An adjustable mounting assembly for a table saw apparatus, the table saw apparatus having a rotatable saw blade operably connected to and extending through a slot in the tabletop of the apparatus and the table saw apparatus further having a fence extending across the tabletop and spaced apart from the saw blade, said assembly comprising:

an elongate track for connecting to the table saw apparatus;

a carriage supported by and movable longitudinally on said track for carrying the fence such that the fence extends across the tabletop of the table saw apparatus; and an incremental adjustment wheel mechanism rotatably supported by said carriage and interengaging said track, said incremental adjustment wheel mechanism being rotated a selected amount to move said carriage longitudinally to a selected position on said track and move the fence to a corresponding selected position across the tabletop; said adjustment wheel mechanism including a threaded support shaft connected to said carriage, said shaft having an axially eccentric portion that supports a manually engageable outer wheel section, said adjustment wheel mechanism further including a fastening nut threadably engaged with said shaft, said fastening nut being selectively loosened and tightened on said threaded shaft relative to said carriage, and said manually engageable outer wheel section being frictionally interengaged with said axially eccentric portion of said shaft such that turning said outer wheel section, when said fastening nut is loosened on said threaded shaft relative to said carriage, adjusts the height of said carriage relative to said track, and turning said outer wheel section, when said fastening nut is tightened on said threaded shaft relative to said carriage, adjusts the longitudinal position of said carriage on said track.

16. The assembly of claim 15 in which said track includes a longitudinal beam for supporting said carriage slidably thereon and a longitudinal rail that is unitarily connected to and supported by said beam, said rail being rotatably interengaged by said adjustment wheel mechanism.

17. The assembly of claim 16 in which said manually engageable outer wheel section is supported outside of said rail, said wheel mechanism further including an inner retaining wheel section interconnected to said outer wheel section and interengaged with said track in a longitudinal slot interiorly of said rail, and an intermediate roller interconnected between said inner and outer wheel sections and circumferentially and rotatably interengaging said rail.

18. The assembly of claim 17 in which said intermediate roller includes an annular elastomeric element for frictionally gripping said rail as said roller rotates over said rail.

19. An adjustable mounting assembly for a table saw apparatus, which table saw apparatus has a rotatable saw blade operably connected to and extending through a slot in a tabletop of the table saw apparatus, the table saw apparatus further having a fence extending across the tabletop and spaced apart from the saw blade, the adjustable mounting assembly comprising:
an elongate unitary track for connecting to the table saw apparatus, said track having a longitudinal rail that includes a horizontal upper edge, said track further including a longitudinal slot that has a horizontal underlying floor;
a carriage supported by and moveable longitudinally on said track for carrying the fence such that the fence extends across the tabletop of the table saw apparatus;
a pair of incremental adjustment wheel mechanisms rotatably connected proximate respective ends of said carriage such that said respective incremental adjustment wheel mechanisms are spaced apart from each other longitudinally on said track, each said incremental wheel mechanism including an outer wheel section, an inner wheel section and an intermediate roller interposed between said outer and inner wheel sections, each said roller circumferentially and rotatably interengaging said horizontal upper edge of said rail and each said inner wheel section circumferentially and rotatably interengaging said horizontal underlying floor of said longitudinal slot to support said carriage on said track;
said outer wheel section of a selected one of said incremental adjustment wheel mechanisms being rotated a selected amount to move said carriage longitudinally on said track to a selected position on said track and to also move the fence to a selected corresponding position across the tabletop;
said rail carrying an electronic sensor strip containing information representative of said selected position of said carriage longitudinally on said track and said corresponding selected position of the fence across the tabletop; and
a digital readout attached to said carriage and slidably interengaged with said rail, said digital readout movably cooperating with said electronic sensor strip for measuring and displaying said selected position of said carriage on said track and said corresponding selected position of the fence across the tabletop.

20. An adjustable mounting assembly for a table saw apparatus, the table saw apparatus having a rotatable saw blade operably connected to and extending through a slot in a tabletop of the apparatus and the table saw apparatus further having a fence extending across the tabletop and spaced apart from the saw blade, said assembly comprising:
an elongate track for connecting to the table saw apparatus;
a carriage supported by and movable longitudinally on said track for carrying the fence such that the fence extends across the tabletop of the table saw apparatus;
an incremental adjustment wheel mechanism rotatably supported by said carriage and interengaging said track, said incremental adjustment wheel mechanism being rotated a selected amount to move said carriage longitudinally on said track to a selected position on said track and move the fence to a corresponding selected position across the tabletop;
said incremental adjustment mechanism including a roller and said track including a longitudinal rail having an upper edge underlying said roller, said roller circumferentially engaging and being rollable along said upper edge of said rail to rollably support said carriage on said track, said incremental wheel adjustment mechanism further including an outer wheel section and an inner wheel section axially interconnected to said roller, said inner wheel section being engageable with and rollable along an underlying floor of a longitudinal slot in said track, which slot is formed in said track adjacent to said inner wheel section such that said inner wheel section further supports said carriage on said track and restricts lateral movement of said outer wheel section and roller relative to said longitudinal rail;
said track carrying an elongate electronic sensor strip containing information representative of said selected position of said carriage longitudinally on said track and said corresponding selected position of the fence across the tabletop; and
a digital readout attached to said carriage and movably cooperating with said electronic sensor strip for measuring and displaying said selected position of said carriage on said track and said corresponding selected position of the fence across the tabletop.

21. The assembly of claim 20 in which said upper edge of said rail and said floor of said slot include flat horizontal surfaces engaged circumferentially by said roller and said inner wheel section respectively.

* * * * *